United States Patent

Botros

[11] 4,089,849
[45] May 16, 1978

[54] MONOAZO DYES HAVING A BENZTHIAZOLYL SUBSTITUTED PHENOL OR NAPHTHOL COUPLING COMPONENT

[75] Inventor: Raouf Botros, Beech Creek, Pa.

[73] Assignee: American Color & Chemical Corporation, Charlotte, N.C.

[21] Appl. No.: 722,204

[22] Filed: Sep. 10, 1976

[51] Int. Cl.² ............... C09B 29/36; C09B 43/00
[52] U.S. Cl. ............... 260/158; 260/146 R; 260/207; 260/304 R
[58] Field of Search ............... 260/158

[56] References Cited

U.S. PATENT DOCUMENTS

| | | | |
|---|---|---|---|
| 2,843,581 | 7/1958 | Riat | 260/158 |
| 3,510,241 | 5/1970 | Dien | 260/158 X |

*Primary Examiner*—Charles F. Warren
*Attorney, Agent, or Firm*—Armstrong, Nikaido, Marmelstein & Kubovcik

[57] ABSTRACT

Azo compounds containing a benzthiazolyl group and corresponding to the formula:

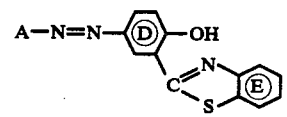

are provided where A represents a radical derived from a diazotizable aromatic hydrocarbon; D is derived from an optionally substituted salicyaldehyde or o-hydroxynaphthaldehyde and E is derived from an optionally substituted o-aminothiophenol. The compounds when applied to metallized polyolefin fabrics, particularly nickel-containing polypropylene fabrics, produce dyeings of strong bright shades which are exceptionally fast to light, dry cleaning and crocking.

12 Claims, No Drawings

MONOAZO DYES HAVING A BENZTHIAZOLYL SUBSTITUTED PHENOL OR NAPHTHOL COUPLING COMPONENT

BACKGROUND OF THE INVENTION

1. Field of the Invention

The present invention relates to azo compounds useful in the dyeing of polyolefins. More particularly, the invention relates to azo compounds having a benzthiazolyl group and which have utility in the dyeing of metallized, or metal-containing polyolefin, especially nickel-containing polypropylene textile materials.

2. Description of the Prior Art

Polypropylene, because of its excellent mechanical strength, high elasticity and resistance to solvents, has found increased utility in recent years as filaments, yarns, fabrics, ropes and the like. Commercially available polypropylene materials generally contain metals or metal salts or chelates to provide stability against degradation due to light. These metals or metal salts or chelates also serve to provide reactive sites for dyes.

Dyes, more particularly, chelatable dyes, having specific utility in the dyeing of such metal-containing, or metal-modified, polypropylene are reported extensively in the literature. Chelatable azo dyes disclosed for use in dyeing metallized polyolefin commonly contain o,o'-dihydroxyazo; o-hydroxy-o'-carboxyazo; o-hydroxy-o'-aminoazo; or o-carboxy-o'-aminoazo chelatable groups. Certain azomethine structures similarly substituted ortho to the —C=N— link have also been reported.

Thus, for example, Siegrist et al, U.S. Pat. No. 3,399,027, discloses a process for dyeing polyolefins containing organic nickel chelate complexes with an aqueous dispersion of an azomethine dye. As the azomethine dyes there are disclosed dyes of the formulas:

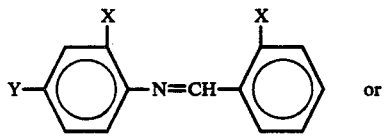

or

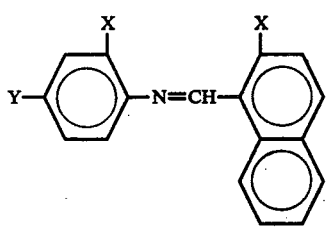

where

X is OH or COOH, and

Y is phenylazo or naphthylazo.

Mohr et al, U.S. Pat. No. 3,389,956, discloses the dyeing of nickel-modified polypropylene textiles with an acyl-o,o'-dihydroxyazo or acyl-o-hydroxy-o'-carboxyazo dye of the formula:

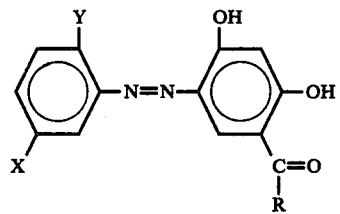

Y being hydroxy or carboxy.

Dyes having chelatable groups of the o,o'-dihydroxyazo and o-hydroxy-o'-carboxyazo type, however, do not produce acceptable shades on metallized polypropylene. Although these groups apparently bind strongly to the metal compound contained in the polypropylene and give dyeings having excellent fastness to rubbing, washing and dry cleaning, they tend to produce dull and rather weak colors. These dyes are also disadvantageous in that there is a drastic change in hue between the unchelated and chelated dyes which can cause uneveness on the metallized fiber depending on the concentration of metal throughout the fiber. This difference in hue between chelated and unchelated dyes may also cause differences in hue between the dyed pile of a carpet of a metal-containing polypropylene and the carpet backing, which is usually made from non-chelatable materials.

It is an object of the present invention, therefore, to provide dyes suitable for dyeing metal-containing, or metal-modified, polyolefins, and particularly, polypropylene, and which avoid or minimize the problems associated with the dyes heretofore employed in the art.

This and other objects of the invention will become apparent from the following summary and description of preferred embodiments.

SUMMARY OF THE INVENTION

According to the present invention azo compounds having a benzthiazolyl group are provided which produce strong, bright shades when suitably dispersed and applied to metal-containing polypropylene fabrics and which are exceptionally fast to light, dry cleaning, and crocking.

The compounds according to the present invention may be represented by the formula (I)

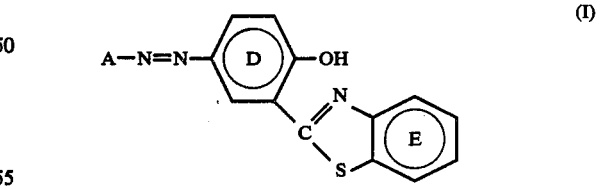

(I)

wherein

A is phenyl or naphthalene which is unsubstituted or substituted with any of alkyl of 1–4 carbons; alkoxy of 1–4 carbons; nitro; cyano; halogen; trifluoromethyl; hydroxy; acyloxy; carboxy; carbalkoxy; acyl; benzoyl; acylamide; benzamido; or carbamyl, the nitrogen being unsubstituted or singly or doubly substituted with alkyl of 1–4 carbons;

D is phenyl or naphthyl derived from a salicylaldehyde or an o-hydroxy-naphthaldehyde and which is unsubstituted or substituted with up to two substituents independently selected from alkyl of 1–4 carbons; alkoxy of 1-4 carbons; fluorine; chlorine; bromine or cyano; and E is derived from an o-aminothiophenol and is unsubstituted or substituted with up to two substituents independently selected from alkyl of 1-4 carbons; alkoxy of 1-4 carbons; nitro; chlorine or bromine.

According to another embodiment of the invention there is provided metal-modified polyolefin textile material dyed with a dye of the general formula (I). The dyed polyolefin textile material has outstanding fastness properties.

Azo compounds containing a benzthiazolyl group are reported in the literature (see, for example, U.S. Pat. Nos. 3,579,498 (260-158); 3,438,964 (260-158); 3,274,171 (260-158); 3,179,650 (260-158) and 2,843,581 (260-158)). None, however, contain the phenolic hydroxyl group ortho to the benzthiazolyl group which is characteristic of the compounds of the invention and which, together with the heteronitrogen or sulfur is believed to provide a chelating site for the metal of the metal-containing polypropylene. Additionally, none are disclosed as having utility in the dyeing of a metal-containing polypropylene.

DETAILED DESCRIPTION

In the azo compounds of the general formula (I), A is a benzene or naphthalene nucleus derived from a diazotizable aromatic amine; the benzene nucleus being unsubstituted or substituted with up to three substituents and the naphthalene nucleus being unsubstituted or substituted with up to two substituents. The substituents are independently selected from alkyl of 1-4 carbons; alkoxy of 1-4 carbons; nitro; cyano; fluoro; chloro; bromo; trifluoromethyl; hydroxy; acyloxy (RCOO-, where R is alkyl of 1-4 carbons); carboxy; carbalkoxy (ROOC—, where R is alkyl of 1-4 carbons); acyl (RCO—, where R is alkyl of 1-4 carbons); benzoyl; acylamide (RCONH—, where R is alkyl of 1-4 carbons); benzamido (ArCONH—, where Ar is phenyl) and carbamyl (H$_2$N—CO—), the nitrogen of which is unsubstituted or singly or doubly substituted with alkyl of 1-4 carbons. Substitution in the benzene nucleus relative to the azo link will typically be in the 2-position, the 3-position, the 4-position, the 2,4-positions, the 2,5-positions, the 2,4,6-positions, the 2,3,4-positions and the 2,4,5-positions. Substitution in the naphthalene nucleus will typically be in the 2-position, the 4-position, the 5-position, the 8-position, the 2,3-positions, the 2,4-positions and the 2,6-positions.

D of the general formula (I) is phenyl or naphthyl derived from a salicylaldehyde or an o-hydroxy-naphthaldehyde and which is unsubstituted or substituted with up to two substituents independently selected from alkyl of 1-4 carbons; alkoxy of 1-4 carbons; cyano; fluoro; chloro and bromo.

E of the general structure is derived from an o-aminothiophenol and which is unsubstituted or substituted with up to two substituents independently selected from alkyl of 1-4 carbons; alkoxy of 1-4 carbons; nitro; chloro and bromo.

As used herein "alkyl" is intended to designate straight or branched chain alkyl of from about 1 to about 4 carbon atoms.

The compounds (I) are obtained by condensing salicylaldehyde or an o-hydroxy-naphthaldehyde, or their substituted derivatives, with an o-aminothiophenol to form a coupler of the formula (II)

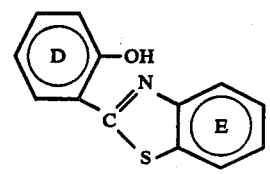

wherein D and E are as defined above. An aromatic amine of the general structure A—NH$_2$, where A is as defined above, is diazotized and coupled into the coupler (II). Alternatively, the dyes may be prepared by diazotizing the aromatic amine and coupling into the salicylaldehyde or the o-hydroxy-naphthaldehyde (the product is hereinafter referred to as the azo-aldehyde derivative) and thereafter condensing the resultant azo-aldehyde derivative with the 2-aminothiophenol. (It is to be noted that reference hereinafter to the aromatic amine, salicylaldehyde, o-hydroxy-naphthaldehyde and an o-aminothiophenol unless otherwise specified includes the unsubstituted and substituted compounds as defined above.)

Aromatic amines, A—NH$_2$, suitable for preparing the monoazo compounds according to the present invention include anilinecarboxylic acids, such as anthranilic acid, 5-chloro-2-aminobenzene-1-carboxylic acid, and 5-nitro-2-aminobenzene-1-carboxylic acid; hydroxy substituted amines such as 1-amino-2-hydroxybenzene, 2-hydroxy-4 or 5-nitroaniline and 2-hydroxy-5-chloroaniline; 4-nitroaniline; orthoanisidine; 3-chloro-o-toluidine, 4-nitro-3-chloro-o-toluidine; p-ethylaniline; p-butylaniline; 2-chloro-5-trifluoromethylaniline; 4-nitro-2-chloroaniline; 2,6-dichloroaniline, and 2,4-dimethoxyaniline; 1-naphthylamine; 1-amino-2-naphthol and 6-amino-2-naphthol-3-carboxylic acid. Other aromatic amines, of course, may be employed as a starting material to prepare the azo dyes according to the invention. The actual choice of the base, however, will generally be limited by practical and economic considerations and availability.

Any salicylaldehyde or o-hydroxy-naphthaldehyde, wherein the aromatic nucleus meets the definition of D of the general formula (I) is believed to be useful in preparing the monoazo compounds according to the invention having the properties described above; substitution in the salicylaldehyde and o-hydroxy-naphthaldehyde nucleus being limited only by the availability of a suitable site in the nucleus for coupling into the aromatic amine. The unsubstituted compounds, salicylaldehyde, 1-hydroxy-2-naphthaldehyde and 3-hydroxy-2-naphthaldehyde, are typically preferred because of their availability.

2-aminothiophenol is typically preferred as the o-aminothiophenol again because of availabillity. Substituted (according to E of the general formula) o-aminothiophenols, however, may be used.

The starting materials employed in the working examples that follow result in dyes that provide dyeings on metal-containing polypropylene, and particularly nickel-containing polypropylene, having good fastness properties. Best results appear to be obtained with dyes prepared from aromatic amines, A—NH$_2$, which are unsubstituted or substituted by alkyl, alkoxy, halogen or trifluoromethyl substituents as defined above; salicylaldehyde and 2-aminothiophenol.

Condensation of the salicylaldehyde or o-hydroxy-naphthaldehyde with the o-aminothiophenol or of the azo-aldehyde derivative with the o-aminothiophenol is conveniently carried out in denatured alcohol at reflux. Yields of the coupler (II) or of the azo compound (I) of greater than 90% can be obtained by this method. Methods such as those reported by Hein et al, U.S. Pat. No. 2,985,661, and Katz, J. Am. Chem. Soc., 75, 712 (1935) may, of course, be used for the condensation but yields are generally poorer.

Diazotization of the aromatic amine and coupling of the diazotized amine into the salicylaldehyde, o-hydroxy-naphthaldehyde or coupler (II) are carried out in conventional ways. Diazotization of the aromatic amine is effected by heating it (if necessary to achieve solution) in an aqueous solution of strong mineral acid such as hydrochloric acid, cooling the resulting solution to a temperature of 0°–10° C., and adding thereto a quantity of sodium nitrite slightly in excess of the stoichiometric requirement. An alternate method of diazotization involves dissolving sodium nitrite in concentrated sulfuric acid, heating to a temperature of about 60°–70° C., cooling the resulting solution to 0°–10° C and adding thereto the aromatic amine.

The coupling reaction is carried out by adding the diazonium salt to a cold aqueous alkaline solution of the respective coupler. The mixture is allowed to react until the coupling is essentially complete, usually in 1–24 hours at 0° C to room temperature and is thereafter filtered and washed with water or water containing dissolved sodium chloride. The product may be reslurried in water which is then made acidic to Congo Red paper with hydrochloric or other acid. The mixture is filtered and the cake is washed neutral with water. The desired azo product is thus obtained in the form of a moist cake. The product may be used in this form or it may be dried before grinding with a suitable agent to form a disperse paste or powder as described below.

The azo compounds (I) of the present invention have outstanding utility in the dyeing of metal-containing polyolefin and especially, nickel-containing polypropylene, fiber materials. The dyed metal-modified polypropylene fiber materials according to the present invention include as the starting polypropylene fiber material any of the conventionally produced polypropylene materials generally designated in the textile art as "polypropylene fibers", which contain a Werner Complex forming metal i.e., chromium, cobalt, aluminum, nickel, or zinc, either as such or in the form of its salts or chelates. The exact metal content of these fibers is not generally specified by the manufacturer, but is believed to vary within the range of about 0.1 to about 2.0 weight percent. The metal improves the dyeing properties of the fiber materials and also serves to stabilize the materials against degradation due to light and heat. Nickel-containing polypropylene materials dyed with the structure of formula (I) have been shown to have excellent fastness properties. Such nickel-containing polypropylene materials are available commercially, for example, under the trademark HERCULON.

To prepare the dye for application to the metal-modified fiber substrates, it must be suitably dispersed. This may be done by any of several well-known methods, e.g., milling as in a ballmill with dispersing agents such as lignin sulfonic acid materials. The resultant aqueous dispersion can be dried, as in a spray-dryer, or preserved and used as a paste. Standardization to any desired lower strength can be done with inert colorless diluents such as water soluble inorganic salts, soluble organic materials or additional dispersant for powders, or water for pastes. Other materials such as preservatives, foam-control agents, and wetting agents (for powders) may be added as desired.

Dispersed pastes are made by wet milling the azo material in conventional equipment in the present of a dispersing agent, preferably sodium lignin sulfonate or sodium alkylnaphthalene sulfonate. Various other commercially available dispersing agents, such as sodium salts of carboxylated polyelectrolytes and the naphthalene sulfonates, e.g., the condensation products of sulfonated naphthalene and formaldehyde, such as sodium dinaphthylmethane disulfonate, are conveniently used. The disperse paste may be cut or standardized to a standard strength with water. The final color content of the finished paste is usually from 5–40 percent by weight (pure color) active dye base.

Disperse powders are prepared by wet milling color in the presence of a dispersant, such as those mentioned hereabove, in equipment such as a ball-mill, Werner-Pfleiderer mill or attritor. The dispersed material is oven or spray dried and micropulverized if necessary to provide the dispersed powder. The color is cut or standardized to a standard strength in a blender with a diluent, such as the same or another dispersant or dextrin. A wetting agent, such as sodium cetyl sulfate or an alkylaryl polyether alcohol may be added to aid in wetting out the product when it is placed in the dye bath. Disperse powders are usually cut or standardized to 10–50 percent by weight color content (pure color).

The disperse dyes may be applied to the metal-containing polypropylene fibers or fabrics in a manner conventional in the dyeing of disperse dyestuffs and may be applied, for example, as neutral, acidic, or alkaline aqueous suspensions, with the use of dispersing agents, from a dyebath, preferably at temperature of from 50° to 105° C. When temperatures of less than about 100° C are employed, it is sometimes advantageous to add a customary carrier substance. These dyes can also be supplied to the metal-containing polypropylene fabrics by a printing process. The printing paste can be thickened with customary thickening agents and may also contain other additives conventionally used with printing pastes. The printing paste is expediently applied to the fabric by a printing block or a roller, after which the printed fabric is dried and steamed at a temperature between 105° and 110° C. After the dyeing or printing of the polypropylene material, it is treated with a hot aqueous soap solution, rinsed and dried. As suitable dyeing and printing techniques there may be mentioned those described in U.S. Pat. Nos. 3,399,027; 3,399,952; 3,492,078; 3,556,709; and 3,360,656.

Nickel-containing carpet printed with dyes of the formula (I) show excellent fastness properties. The fabric is colored with strong, bright yellow to brown hues which are exceptionally fast to light, dry cleaning, crocking, gas and heat.

The invention may be better understood by referring to the working examples set forth below. In the working examples, the properties of dyed or printed polypropylene were evaluated according to the following tests:

Test No. 1: (Crocking) A crock test on an air dried sample, i.e., a portion of printed or dyed fiber, fabric or carpet construction, is conducted in accordance with AATCC Test Method 8-1972, page 112 of the 1974 Technical Manual of AATCC.

Test No. 2: (Heat stability) A heat stability test determined by subjecting an air dried sample to a heat treatment of 250° F for 20 minutes. The heat treated sample is compared to an air dried sample with respect to shade change:

Test No. 3: (Crocking) The sample from Test No. 2 is tested for crocking according to the procedure of Test No. 1. There should be no change in crocking.

Test No. 4: (Light fastness) A practical strength of a dyed or printed air dried sample is exposed to a Xenon arc lamp (AATCC Test Method 16E-1974, page 133 of the 1974 Technical Manual of the AATCC). A range of 3L4 to 4L4 exposures are the lower limit of desirability in the carpet trade.

Test No. 5: (Dry cleaning) An air dried sample is tested for color fastness to dry cleaning in accordance with AATCC Test Method No. 132-1973, page 117 of the 1974 Technical Manual of the AATCC.

EXAMPLE I

A. Preparation of rhe Coupler

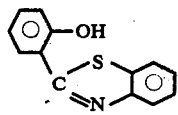

(M.W. 227)

A mixture of 50 g. o-aminothiophenol and 48.8 g. salicylaldehyde was refluxed under nitrogen in 60 g. denatured alcohol for 3 hours. The reaction mixture was stirred to room temperature and filtered. The cake was washed with 300 g. denatured alcohol and was dried in an oven.

Yield: 83.6 g. Theory: 90.8 g. (92.1%)

B. Preparation of the Azo Compound

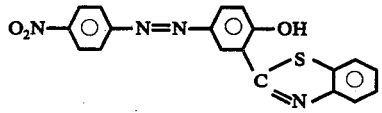

(M.W. 376)

A mixture of 13.8 g. p-nitroaniline in 40 g. 32% hydrochloric acid and 40 ml. water was heated at 70° C to complete solution. The clear solution was drowned into an ice-water mixture, and was diazotized below 5° C with 7 g. sodium nitrite dissolved in 50 ml. water. The clear diazo solution was held at 0° C. A mixture of 22.7 g. 2-(o-hydroxyphenyl)benzothiazole (Part A) and 150 g. denatured alcohol was heated to complete solution, then added while still hot to a solution of 37 g. soda ash and 4 g. sodium hydroxide flakes in 750 ml. water. Enough ice was added to bring the temperature to 0° C. The above diazo solution was then added during one hour holding the temperature at 0° C. After coupling was complete, the mixture was filtered and the cake was reslurried, without washing, into 1000 ml. water and was made acidic to Congo Red paper with hydrochloric acid. The mass was filtered and the cake was washed neutral with water.

Yield: 33.2 g. Theory: 37.6 g. (88.3%)

A mixture of 20 g. of the above product and 30 g. Lignosol FTA (a commercially available ligninsulfonic acid dispersant) in 150 ml. water was ball-milled until dispersion test was satisfactory.

Yield: 200 g. 10% Color Content Paste

EXAMPLE II

Dyeing of a Nickel-containing Polypropylene with a Printing Paste

A printing paste was prepared with 1000 parts of Tragacanth gum thickener (polysaccharides of galactose, fructose, xylose and arabinose with glucuronic acid), 5 parts acetic acid and a quantity of dispersed dyestuff corresponding to 5 to 10 parts of a pure dyestuff as obtained in Example I(B). A fabric made of fibers of polypropylene containing nickel was printed on a roller. The fabric was dried and steamed for 8 minutes at 105°-110° C. The fabric was vigorously washed in a bath of soap at 90° C. A brilliant brown shade was obtained which possessed outstanding fastness to light and crocking and excellent resistance to the chlorinated solvents used in dry cleaning.

EXAMPLE III

Preparation of the Azo Compound

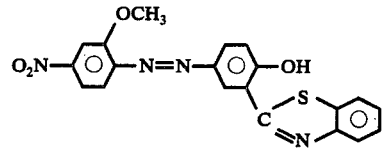

(M.W. 406)

A mixture of 16.8 g. 4-nitro-o-anisidine, 1 g. Tween 20, 40 g. 32% hydrochloric acid and 40 ml. water was heated at 60° C for one hour. The mixture was drowned hot into an ice-water mixture which contained 1 g. Tween 20. The slurry was then diazotized with a solution of 7 g. sodium nitrite in 100 ml. water. After the diazotization was complete, excess nitrous acid was destroyed with sulfamic acid and the mixture was clarified. The clear diazo solution was coupled with 2-(o-hydroxyphenyl)benzothiazole as described in Example I(B).

Yield: 38.7 g. Theory: 40.6 g. (95.3%)

A 10% color content paste was made by the procedure described in Example I(B).

EXAMPLE IV

Dyeing of Nickel-containing Polypropylene from a Dyebath

Piece goods of "HERCULON TYPE 40" an isotactic polypropylene containing a bis(p-alkylphenol) mono sulfide nickel compound (believed to be in an amount of 0.12% calculated as metallic nickel by weight based on the weight of the polypropylene) were placed in a bath set at 35° C containing 1% Triton X-100 (iso-octyl-phenyl polyethoxy ethanol), based on weight of fiber, 1-1.5% acetic acid (pH3-4) and a 1% (on weight of fiber) dispersion of the dye from Example III. After 5 minutes the temperature was raised to 95° C over a 30 minute period. The dyeing was continued at 95° C for an additional 45 minutes. The piece goods were removed from the dye bath, rinsed and soaped in 0.5% soap solution at 90° C for 10 minutes. The dyed fabrics were rinsed with water and dried. They were colored a deep yellowish orange shade of excellent light fastness and very good resistance to crocking and dry cleaning solvents.

EXAMPLE V

Preparation of the Azo Compound

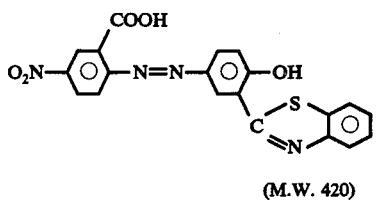

(M.W. 420)

A mixture of 18.2 g. 2-amino-5-nitrobenzoic acid and 5.3 g. soda ash in 400 ml. water was stirred at 60° C to complete solution. Then there was added 7.2 g. sodium nitrite dissolved in 50 ml. water. The hot clear solution was added to a mixture of 500 g. ice and 50 g. 32% hydrochloric acid while holding the temperature at 0° C. The diazo mixture was stirred at 5° C for one and one half hour. Excess nitrous acid was destroyed with sulfamic acid and the diazo mixture was clarified. The clear diazo-solution was coupled with 2-(o-gydroxyphenyl)benzothiazole as described in Example I(B). The above product was obtained in 82% yield. The dispersed product dyed nickel-containing polypropylene fibers in attractive yellowish brown shades having very good light fastness and excellent resistance to crocking and dry cleaning solvents.

EXAMPLE VI

Preparation of the Azo Compound

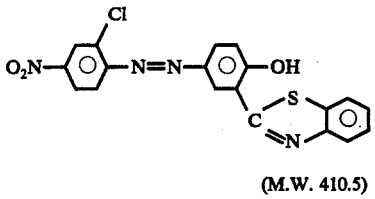

(M.W. 410.5)

A mixture of 17.3 g. 2-chloro-4-nitroaniline in 40 g. 32% hydrochloric acid and 40 ml. water was heated to a smooth slurry at 65°-70° C. The hot mixture was drowned into 400 g. ice and 200 ml. water. Then there was added a solution of 7.2 g. sodium nitrite dissolved in 50 ml. water. The mixture was stirred at 0°-5° C for 2 hours. Excess nitrous acid was destroyed with sulfamic acid and the diazo mixture was clarified. The clear diazo solution was coupled with 2-(o-hydroxyphenyl) benzothiazole as described in Example I(B). The above product was obtained in 93% yield. When dispersed and applied to nickel-containing polypropylene, it produced strong reddish brown shades of excellent light fastness and outstanding resistance to dry cleaning solvents and crocking.

EXAMPLE VII

Preparation of the Azo Compound

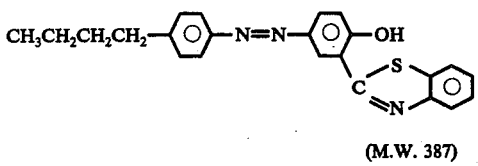

(M.W. 387)

A mixture of 15 g. p-n-butylaniline in 30 g. 32% hydrochloric acid, 300 ml. water and 1 g. Tween 20 was stirred at room temperature to complete solution. The clear solution was iced to 0° C and was diazotized with a solution of 7 g. sodium nitrite in 100 ml. water. After stirring one half hour at 0° C, excess nitrous acid was destroyed with sulfamic acid. The clear diazo solution was coupled with 2-(o-hydroxyphenyl)benzothiazole as in Example I(B). The above product was obtained in 61.5% yield. The dispersed product dyed nickel-containing polypropylene in bright golden yellow shades having excellent general fastness properties.

EXAMPLE VIII

Preparation of the Azo Compound

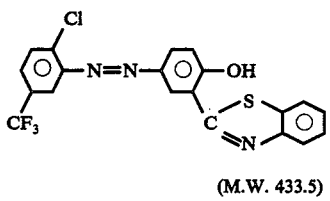

(M.W. 433.5)

A mixture of 19.6 g. 3-amino-4-chlorobenzotrifluoride in 50 g. 32% hydrochloride acid, 50 ml. water and 1 g. Tween 20 was stirred at room temperature to a smooth slurry. The mixture was cooled to −5° C and was diazotized by adding dropwise, during one hour, a solution of 7.2 g. sodium nitrite in 50 ml. water. After stirring one hour at 0° to −5° C, excess nitrous acid was destroyed with sulfamic acid and the diazo solution was clarified. The clear diazo solution was coupled with 2-(o-hydroxyphenyl)benzothiazole as in Example I(B). The above product was obtained in 78% yield. The dispersed dye, when applied to nickel-containing polypropylene according to the procedure of Example II, produced attractive brown shades of outstanding light fastness and excellent resistance to crocking and dry cleaning solvents.

EXAMPLE IX

Preparation of the Azo Compound

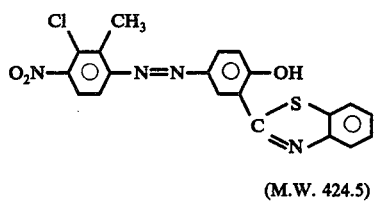

(M.W. 424.5)

A mixture of 18.4 g. 4-nitro-3-chloro-o-toluidine and 100 g. 66° Be sulfuric acid was stirred to complete solution. The clear solution was drowned into 500 g. ice, 500 ml. water, 3 g. Tween 20 and 25 g. 32% hydrochloric acid. The mixture was diazotized with a solution of 7 g. sodium nitrite in 50 ml. water. The diazo mixture was stirred at 0°-5° C for 2 hours. Excess nitrous acid was destroyed with sulfamic acid and the diazo mass was clarified. The clear diazo solution was coupled with 2-(o-hydroxyphenyl)benzothiazole as in Example I(B). The above product was obtained in 77.6% yield. When dispersed and applied to nickel-containing polypropylene, it produced yellowish brown shades of excellent general fastness properties.

EXAMPLE X

Preparation of the Azo Compound

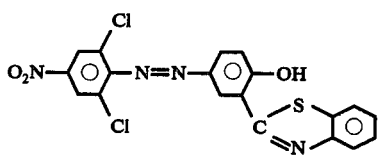

(M.W. 445)

20.7 g. of 2,6-dichloro-4-nitroaniline was added at 0° C to 100 g. 66° Be sulfuric acid which contains 7.2 g. sodium nitrite. The mixture was stirred 2 hours at 0°-5° C. A mixture of 22.7 g. 2-(o-hydroxyphenyl)benzothiazole and 150 g. denatured alcohol was heated to complete solution, then added while still hot to a solution of 150 g. soda ash and 4 g. sodium hydroxide flakes in 750 ml. water. Enough ice was added to bring the temperature to 0° C. The above diazo mass was then added carefully to the solution of coupler during 2 hours holding the temperature at 0° C. After coupling was complete, the mixture was filtered and the cake was reslurried, without washing, into 1000 ml. water and was made acidic to Congo Red paper with hydrochloric acid. The mass was filtered and the cake was washed neutral with water. The above product was obtained in 78.5% yield. When dispersed and printed on nickel-containing polypropylene fibers, it produced dark brown shades of outstanding resistance to crocking and chlorinated dry cleaning solvents.

EXAMPLE XI

Preparation of the Azo Compound

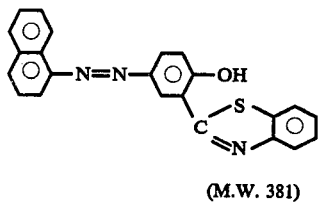

(M.W. 381)

A mixture of 32.2 g. 1-naphthylamine in 80 g. 32% hydrochloric acid and 400 ml. water was heated to a complete solution. The clear solution was iced to 0° C and was diazotized with a solution of 15.8 g. sodium nitrite in 100 ml. water. After stirring 30 minutes at 0° C, excess nitrous acid was destroyed with sulfamic acid and the diazo solution was clarified. The clear diazo solution was coupled with 2-(o-hydroxyphenyl)benzothiazole as described in Example I(B). The above product was obtained in 87.5% yield. When dispersed and printed on nickel-containing polypropylene fabric, it produced yellowish orange shades having very good light fastness and excellent resistance to crocking and dry cleaning solvents.

EXAMPLE XII

Preparation of the Azo Compound

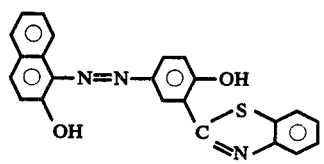

(M.W. 397)

A mixture of 39.5 g. 1-amino-2-naphthol in 80 g. 32% hydrochloric acid and 400 ml. water and stirred and iced to 5° C. Then there was added in sequence 0.5 g. copper sulfate and a solution of 17.5 g. sodium nitrite dissolved in 100 ml. water. After stirring one hour excess nitrous acid was destroyed with sulfamic acid. The diazo mixture was coupled with 2-(o-hydroxyphenyl)benzothiazole as described in Example I(B). The above product was obtained in 68% yield. The dispersed product dyed nickel-containing polypropylene fibers in attractive brown shades of excellent general fastness properties.

EXAMPLES XIII – XX

Following the procedures outlined in the foregoing examples, dyes are prepared as shown in Table I which is to be read in conjunction with the general formula:

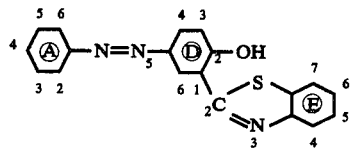

Nickel-containing polypropylene is dyed with each compound to produce dyeings having good fastness properties and having the shades indicated in the table.

TABLE I

| Ex. | Substituents on Ring A | Substituents on Ring D | Substituents on Ring E | Shades |
|---|---|---|---|---|
| XIII | 2-C$_2$H$_5$ | 4-OCH$_3$ | 6-CH$_3$ | Yellowish Orange |
| XIV | 4-COOC$_2$H$_5$ | 3-C$_2$H$_5$ | 6-OCH$_3$ | Orange |
| XV | 2-OCH$_3$ | 3-Cl | — | Golden Yellow |
| XVI | 4-CO-C$_6$H$_5$ | 3-CN | 6-NO$_2$ | Orange |
| XVII | 3-NHCOCH$_3$ | 3-F | — | Golden Yellow |
| XVIII | 4-NHCOCH$_3$ | 4,6-di-OCH$_3$ | 5-NO$_2$ | Orange |
| XIX | 2-CF$_3$ | 3,4-di-OC$_2$H$_5$ | 6-Br | Golden Yellow |
| XX | 2-COOCH$_3$ | 6-OCH$_3$ | — | Golden Yellow |

What is claimed is:

1. An azo compound of the formula:

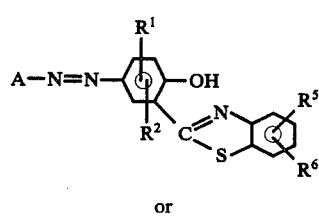

or

-continued

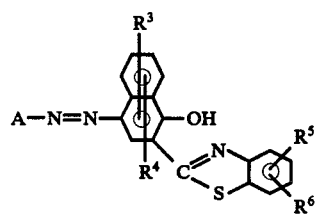

wherein
- A is phenyl which is unsubstituted or mono, di or trisubstituted, or naphthyl which is unsubstituted or mono or disubstituted, the substituents being independently selected from the group consisting of alkyl of 1–4 carbon atoms; alkoxy of 1–4 carbon atoms; nitro; cyano; fluoro; chloro; bromo; trifluoromethyl; hydroxy; RCOO—, where R is alkyl of 1–4 carbons; carboxy; ROOC—, where R is alkyl of 1–4 carbons; RCO—, where R is alkyl of 1–4 carbons; benzoyl; RCONH—, where R is alkyl of 1–4 carbons; ArCONH—, where Ar is phenyl; and carbamyl, the nitrogen of which is unsubstituted or singly or doubly substituted with alkyl of 1–4 carbons;
- $R^1$, $R^2$, $R^3$ and $R^4$ are independently selected from the group consisting of hydrogen; alkyl of 1–4 carbons; alkoxy of 1–4 carbons; cyano; fluorine; chlorine and bromine; and
- $R^5$ and $R^6$ are independently selected from the group consisting of hydrogen; alkyl of 1–4 carbons; alkoxy of 1–4 carbons; nitro; chlorine and bromine.

2. The compound of claim 1,

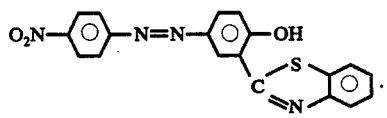

3. The compound of claim 1,

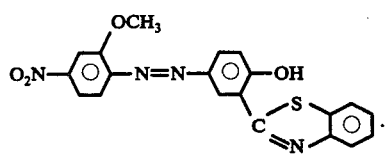

4. The compound of claim 1,

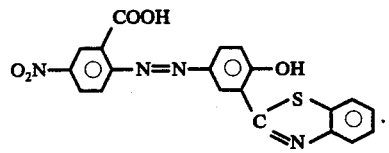

5. The compound of claim 1,

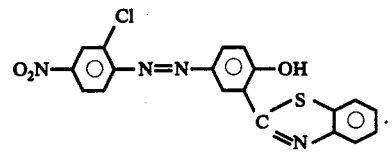

6. The compound of claim 1,

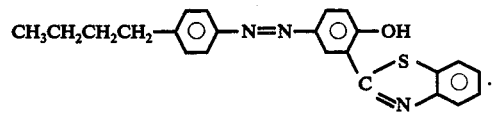

7. The compound of claim 1,

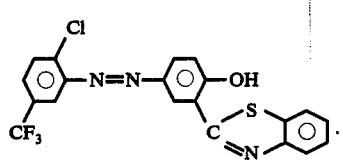

8. The compound of claim 1,

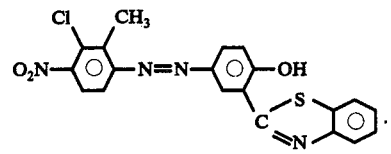

9. The compound of claim 1,

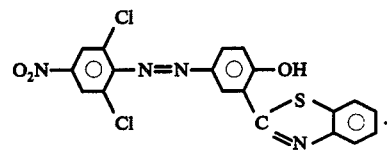

10. The compound of claim 1,

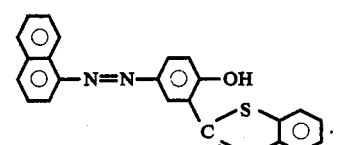

11. The compound of claim 1,

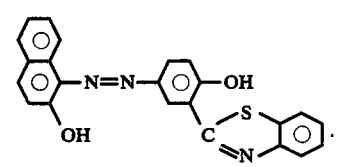

12. The compound of claim 1 wherein said substituents for A are selected from the group consisting of alkyl of 1–4 carbon atoms and alkoxyl of 1–4 carbon atoms.

* * * * *